(12) United States Patent
Hess et al.

(10) Patent No.: US 8,814,675 B2
(45) Date of Patent: Aug. 26, 2014

(54) METHOD OF OPERATING AN ONLINE GAME USING TERRAFORMED GAME SPACES

(75) Inventors: Chuck L. Hess, Kalamazoo, MI (US); Daniel M. Marks, Decatur, GA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/569,174

(22) Filed: Aug. 7, 2012

(65) Prior Publication Data

US 2013/0178256 A1 Jul. 11, 2013

Related U.S. Application Data

(60) Provisional application No. 61/574,747, filed on Aug. 9, 2011.

(51) Int. Cl.
*A63F 13/00* (2014.01)
*A63F 13/10* (2006.01)

(52) U.S. Cl.
CPC ......... *A63F 13/00* (2013.01); *A63F 2300/6018* (2013.01); *A63F 2300/609* (2013.01); *A63F 13/10* (2013.01)
USPC .................................. 463/30; 463/36; 463/42

(58) Field of Classification Search
USPC ................................................. 463/30, 36, 42
See application file for complete search history.

(56) References Cited

U.S. PATENT DOCUMENTS

| 2001/0003708 A1* | 6/2001 | Aizu et al. ........................ 463/7 |
| 2007/0207856 A1* | 9/2007 | Sato ................................ 463/32 |
| 2010/0248843 A1* | 9/2010 | Karsten ........................... 463/43 |

* cited by examiner

*Primary Examiner* — James S McClellan
(74) *Attorney, Agent, or Firm* — Martine Penilla Group, LLP (57) ABSTRACT

The present invention provides methods for modifying the topography of a game space to produce in-game benefits. In a preferred embodiment, a player may raise the topography to create hills and mountains, or lower the topography to create ponds, rivers, and lakes, with each such modification resulting in additional in-game benefits.

20 Claims, 10 Drawing Sheets

METHOD OF OPERATING AN ONLINE GAME USING TERRAFORMED GAME SPACES

COPYRIGHT NOTICE

A portion of this application may contain materials subject to copyright protection. The copyright owner has no objection to the reproduction of this material in the same form as filed with the U.S. Patent and Trademark Office, but all other copyright rights are reserved.

PRIORITY

This application claims priority to U.S. Provisional Patent 61/574,747 filed on Aug. 9, 2011, and entitled "Method of Operating An Online Game Using A Globe-Shaped Controller".

FIELD OF THE INVENTION

The present invention relates to methods of operating an online game and, more specifically, to an online game in which the topography of the game space may be modified to produce in-game benefits.

BACKGROUND OF THE INVENTION

Computer games have grown from simple single-player, text-based games playable on stand-alone desktop computers to massive multi-player games using high-resolution graphics playable across global networks.

The newest and most popular computer games allow members of online social networks to play games in which they build their own virtual worlds and share them with each other. For example, an online social network called Facebook offers such online social games to over 700 million members, such as Zynga's Cityville, LOLapp's Ravenswood Fair, and Digital Chocolate's Millionaire City.

Many online social games use a game play environment (or "game space") with fixed topographical elements. For example, a game space with a fixed number of mountains, rivers, and/or farming plains in fixed locations at fixed sizes. At most, a player may place crops, trees, or other decorative features into the game space but may not modify the underlying topographical features.

Games with fixed topography suffer from numerous drawbacks. First, such games limit the creativity and enjoyment of players. For example, a player may want to re-create the topography of their home town in their virtual world. Second, such games restrict game designers from providing additional in-game benefits. For example, a game designer may want to provide a player with gold ore awards for mining a new mountain. And, third, such games may hamper game operators from maximizing revenues. For example, a player may be willing to pay for the ability to add a stream or mountain to their game space.

Thus, there is a need for an online social game which allows a player to modify the topographical features of a game space to produce in-game benefits.

BRIEF DESCRIPTION OF THE PREFERRED EMBODIMENTS

The present invention provides methods for modifying the topography of a game space to produce in-game benefits. In-game benefits may include any element that provides the player with additional resources to play, decorate, operate, or monetize the game. For example, in-game benefits may include energy to take actions within the game, in-game currency to purchase virtual goods from the game, or objects to place into the virtual world comprising the game.

In a preferred embodiment, a player may raise the topography to create hills and mountains, or lower the topography to create ponds, rivers, and lakes. The modification of the topography produces in-game benefits. For example, the creation of a mountain results in the addition of more gold ore for the player to mine. The additional in-game benefits are located within the modified topographical feature. For example, a new pond contains fish that players can catch to earn rewards. Any modification of the topography may be modified again. For example, a mountain modified into a lake and then modified back into a hill.

In an alternative embodiment, modifying topography may result in any type of in-game benefit depending on the nature of the modification. For example, creating a river adds "fish" elements to the game whereas creating an ocean adds "whale" elements.

In an alternative embodiment, modifying topography may result in any amount of in-game benefits from a single, one-time benefit to an infinite, recurring benefit. For example, creating a mountain provides a source of "gold" element that replenishes every 24 hours.

Further, the amount of in-game benefits may be affected by the extent, magnitude, duration or other aspect of the topographical modification. For example, the amount of in-game benefits may be proportional to the extent and magnitude of the modifications to the topography.

In an alternative embodiment, modifying topography may introduce in-game benefits at any location in the game space with or without regard to the location of the modifications. For example, creating a mountain range adds "oil" elements to an adjacent farming plain.

In an alternative embodiment, topography may be modified to any magnitude from a bottomless ocean to a towering mountain peak. For example, a player may adjust a particular location in the virtual world from a flat plain to a shallow river stream to a deep ocean.

In an alternative embodiment, topography may be modified for any duration from an instant to eternity. For example, a player may adjust the topography of a virtual world for 24 hours at which point the topography returns to its original state.

In an alternative embodiment, modifying topography removes the benefits inherent to the prior topography. For example, creating a mountain range from a lake removes the "fish" elements associated with the prior lake.

In an alternative embodiment, modifying topography may cost any amount from nothing to any sum of virtual or real world currency. For example, a player pays 1 in-game credit to modify a specific location in the game space from a farm plain into a mountain peak.

In an alternative embodiment, a player may modify the topography of one or more other players. For example, a first player may access the virtual world of a second player and modify a mountain range into an ocean.

DETAILED DESCRIPTION OF A PREFERRED EMBODIMENT

In a preferred embodiment of the present invention, a player builds a virtual world comprised of game objects placed onto the topography of a digital game space.

Figure 1:
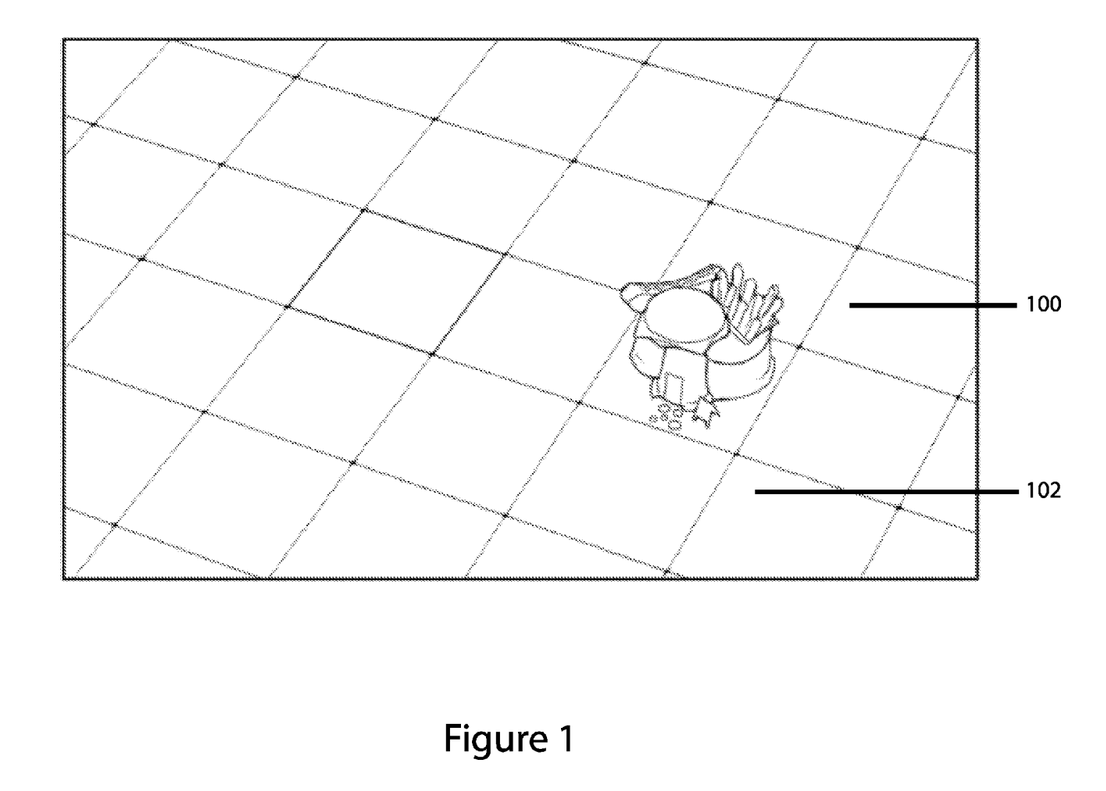
FIG. 1 illustrates an initial topographical state of a game space

In FIG. 1, the game space 100 displays a virtual world that may contain any number or type of buildings, trees, flowers, paths, roads, decorations, and/or other objects. Further, some or all of the virtual world objects may be moved, rotated, adjusted, combined, removed, stored, or otherwise modified during the play of the game. The virtual world may also be populated by any number or type of creatures, animals, or other beings controlled by players and/or operated by a computer. The size of a virtual world, number of objects, and size of population may be limited by design but are otherwise infinitely expandable.

The topography of game space 100 in FIG. 1 is entirely flat. The flat topography may support building roads, buildings, and trees. A single building 102 is shown. In addition, the flat topography may also provide in-game benefits from planting crops (not shown) or drilling for oil (not shown).

Figure 2A:
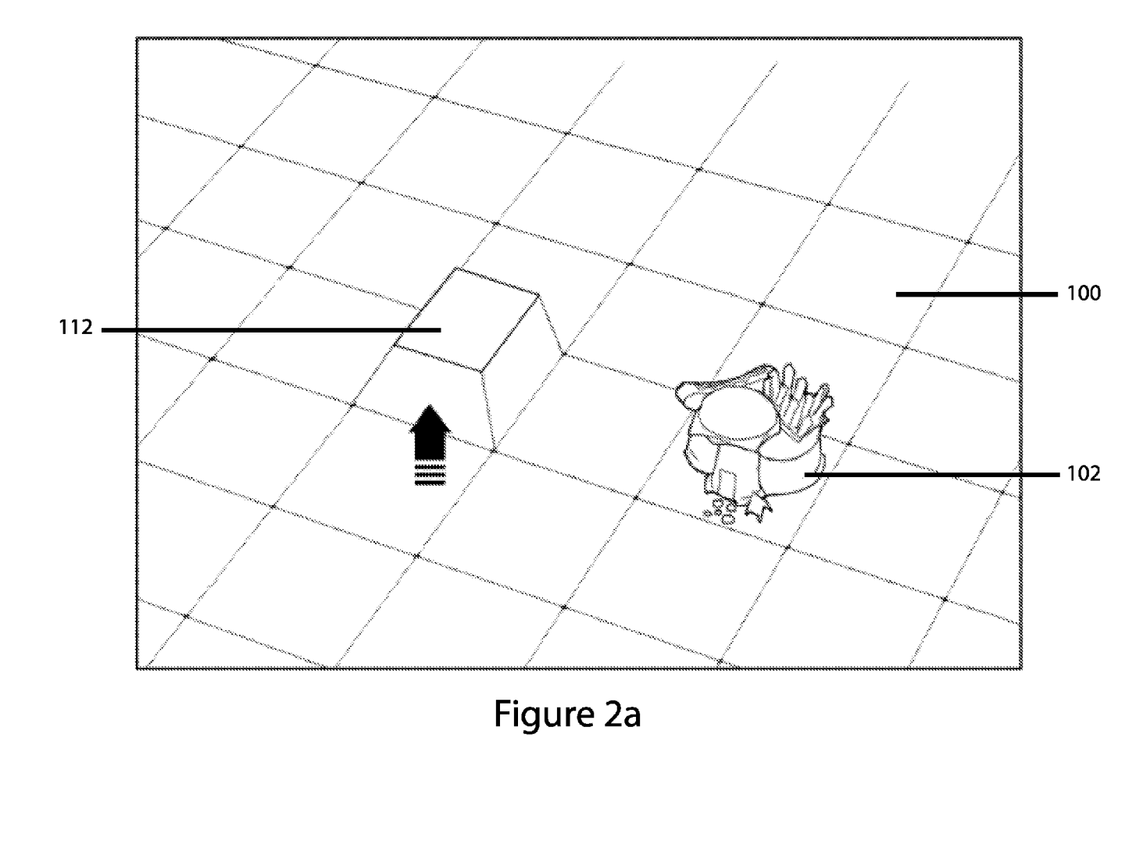
FIGS. 2a-2e illustrate a modified topographical state of game space with mountains.
Figure 2B:
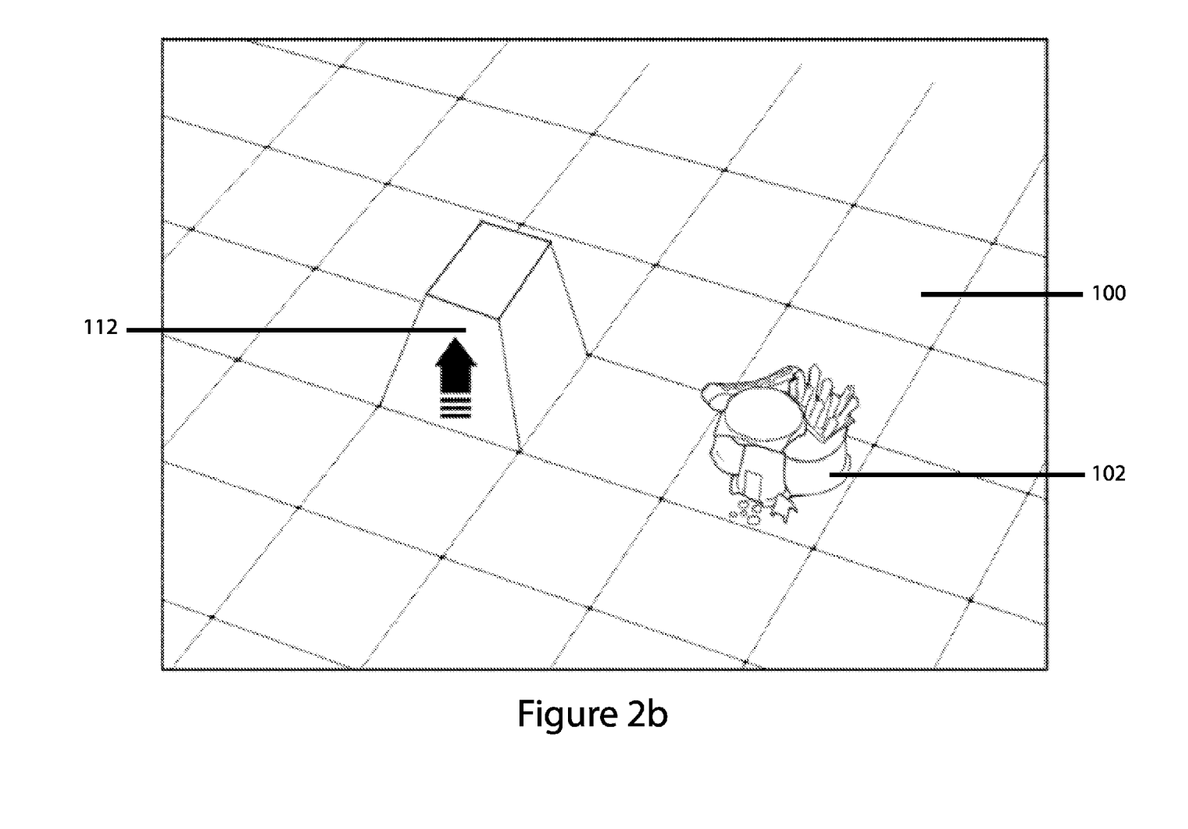

In FIG. 2a, the topography of the game space 100 has been modified by raising the elevation of a single segment 112. The coloration and texture of the raised segment 112 may be altered to indicate elevation (not shown). In FIG. 2b, the raised segment 112 is raised again. The coloration and texture of the raised segment 112 may be altered again to indicate even greater elevation (not shown).

Figure 2C:
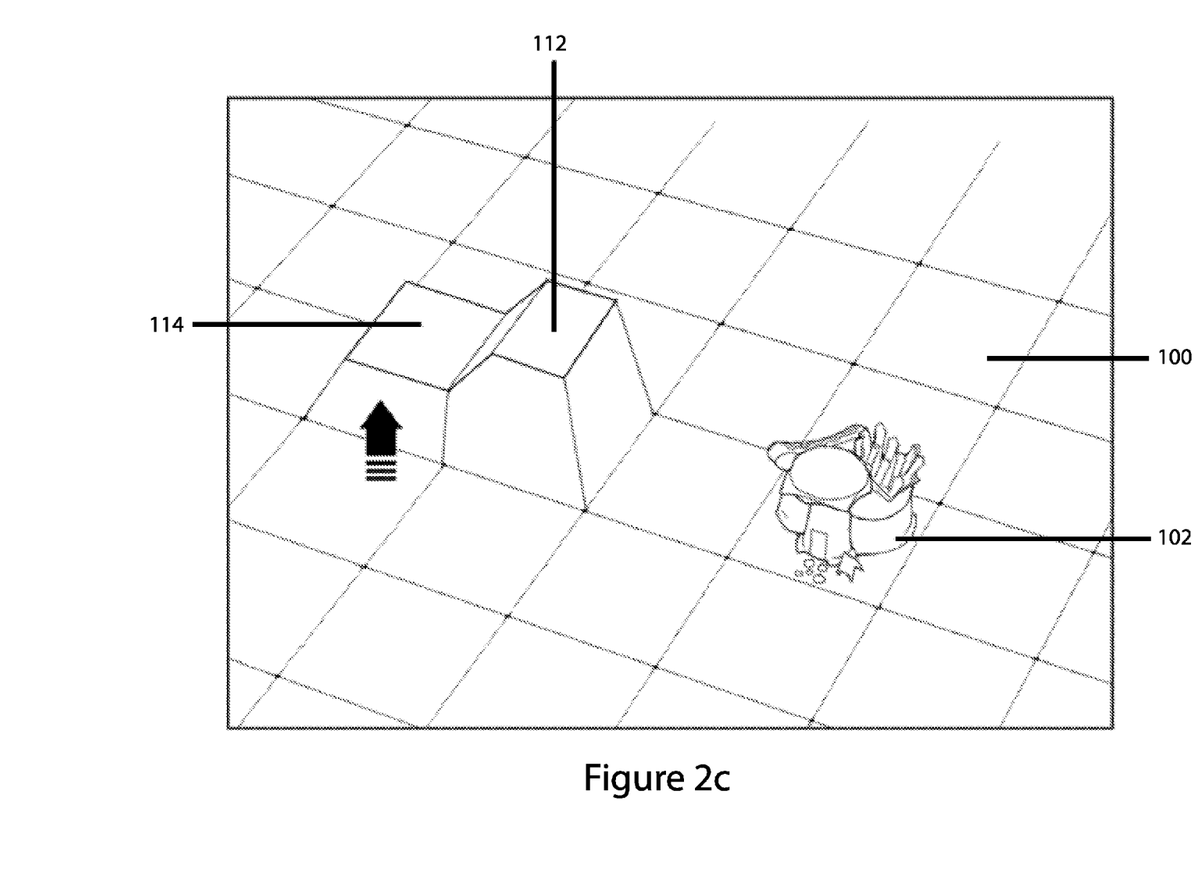

In FIG. 2c, a segment 114 is raised that lies adjacent to the first raised segment 112. The newly raised segment 114 is melded into the shape and contour of the first raised segment 112. The two raised segments 112 and 114 become part of a mountain range.

Figure 2D:
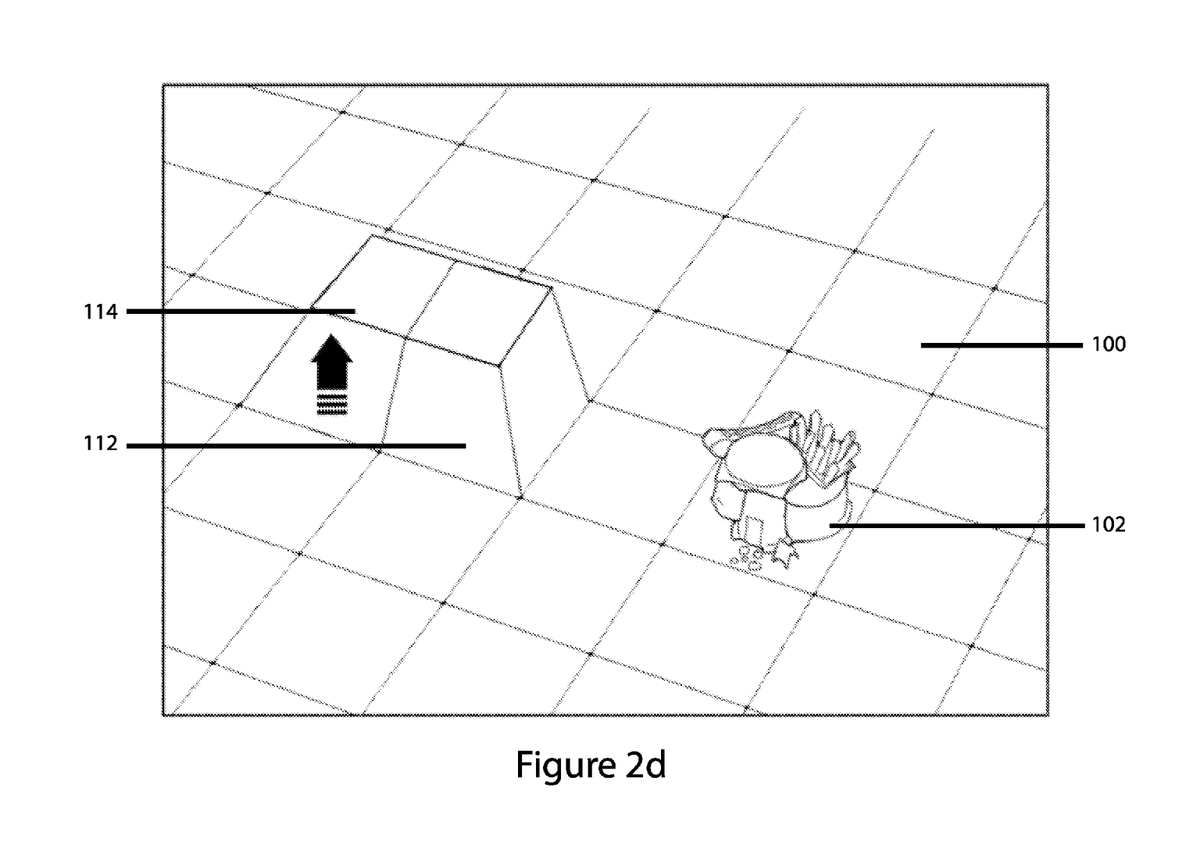

In FIG. 2d, segment 114 is raised again to the same height as segment 112. The coloration and texture of these raised segments may indicate elevation and serve to meld the segments into a coherent and contiguous mountain range (not shown) or grassy plateau (not shown).

Figure 2E:
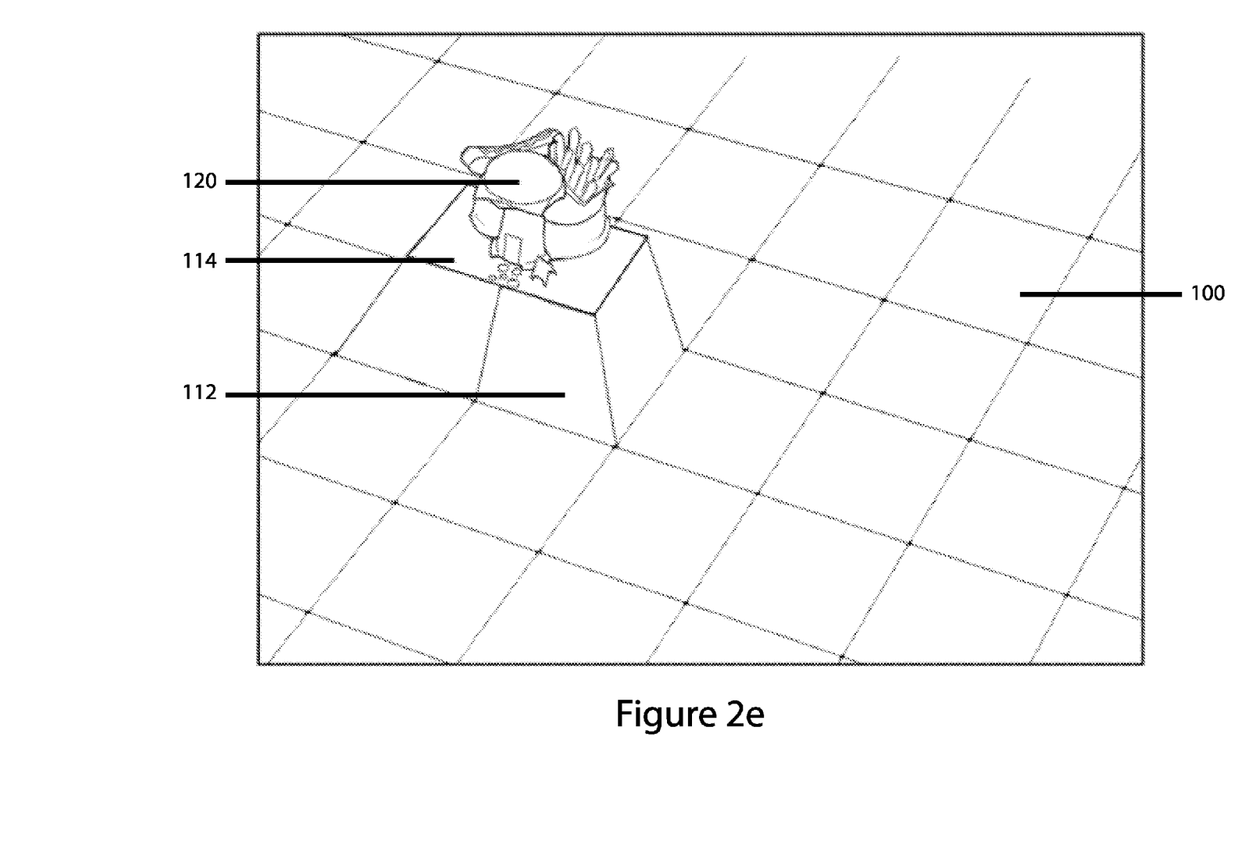

The mountainous topography created in FIGS. 2a-d provides new in-game benefits: metal ores, such as gold, that can be mined; animals, such as mountain goats, that can be herded; or plants, such as pine trees, that can be harvested. Further, a house 120 may be placed on the mountains or plateaus to generate higher rents or other benefits, as shown in FIG. 2e.

Figure 3A:
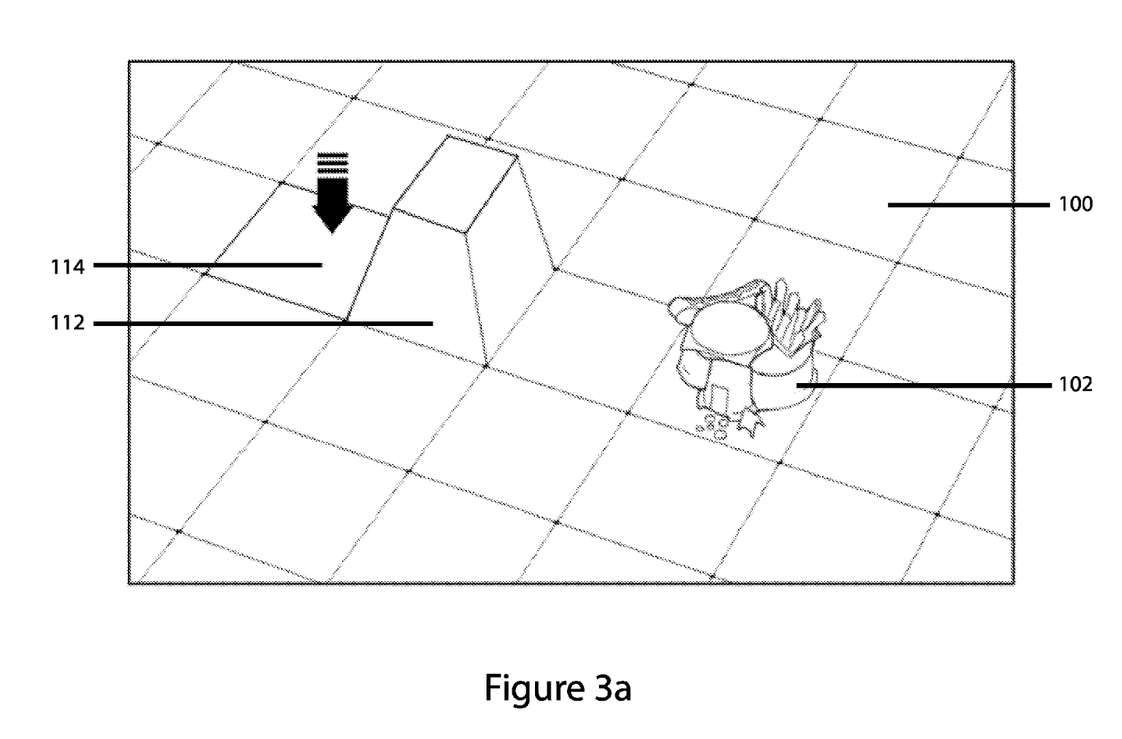
FIGS. 3a-3d illustrate a modified topographical state of game space with a lake.
Figure 3B:
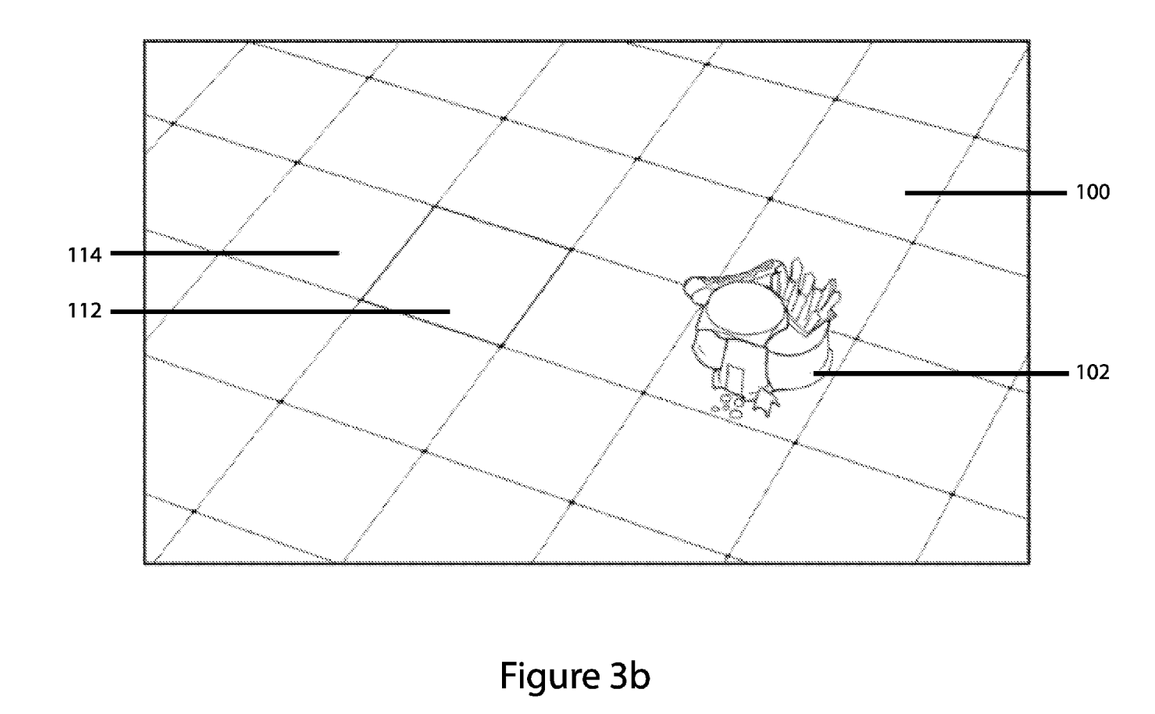

In FIG. 3a, the topography of game space 100 is modified by lowering raised segment 114 to ground level. The coloration and texture of the segment 114 may be altered to indicate the change in elevation (not shown) to match other ground level segments at the same elevation. In FIG. 3b, segment 112 is also lowered to ground level to return to a flat topography.

Figure 3C:
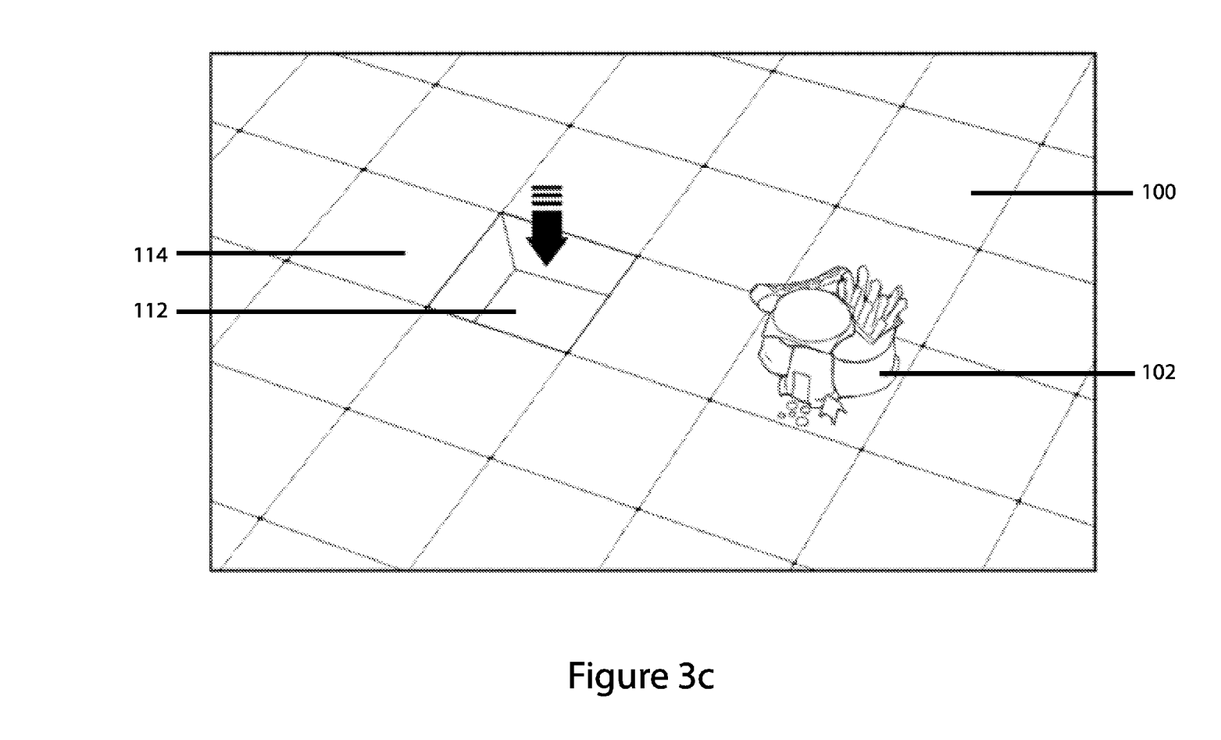
Figure 3D:
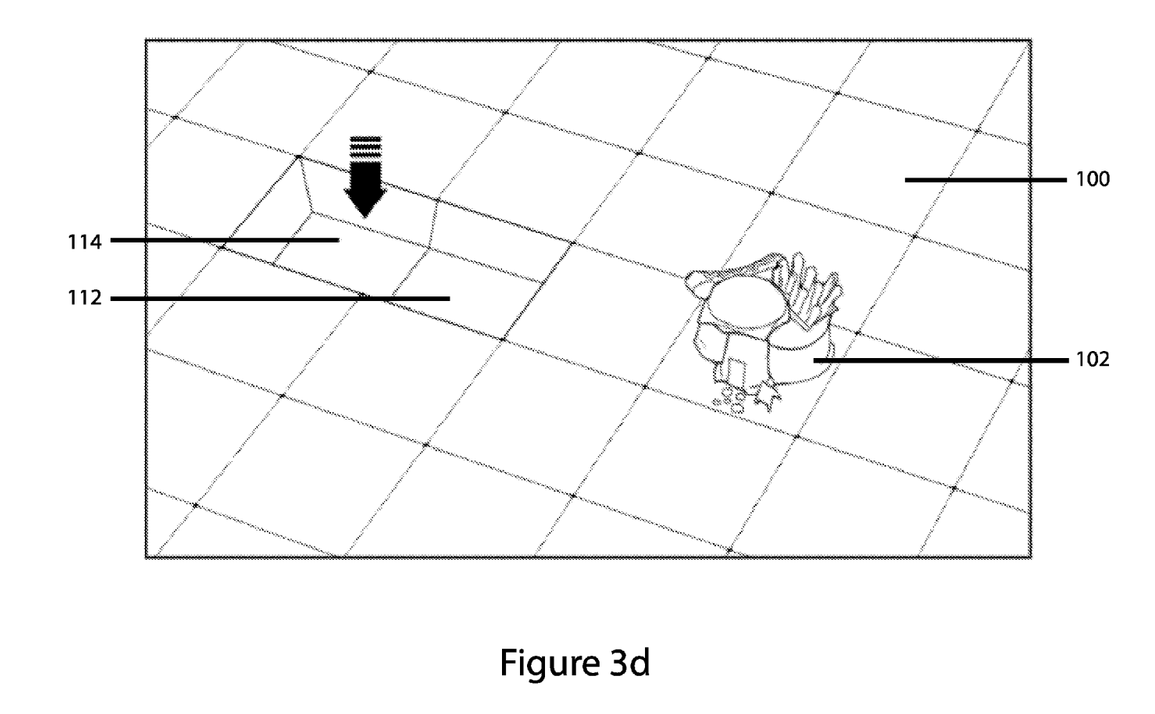

In FIG. 3c, segment 112 is lowered below ground level to create a depression. A depression may be indicated as water, such as a lake (not shown). In FIG. 3d, segment 114 is also lowered below ground level. Since the segments 112 and 114 are contiguous, one large depression or body of water is formed. Non-contiguous segments would form their own independent depressions or bodies of water (not shown).

FIGS. 3a-d show the topography of game space 100 being modified to replace a raised topography (i.e. mountain range) with a depression (i.e. lake). The in-game benefits associated with mountains have been removed and replaced with new in-game benefits specific to lakes: fish, such as trout, which can be caught; and water which can be used for drinking and irrigation. Further, houses placed at the water's edge may generate higher rents.

Network & Systems

The present invention may be implemented on computer-based networks using systems comprised of interconnected client and server devices. In a preferred embodiment, server and client devices operate across the Internet using one or more of the following networks: wired, wireless, satellite, and cellular communication. Client devices are connected to the networks via a network service provider or wireless carrier; servers are connected to the networks via modems, routers and/or networking switches.

Clients.

A client device is generally computer-based equipment such as a desktop computer, laptop computer, computer tablet, personal digital assistant, mobile phone, smart phone, mobile gaming device, and/or console game system that is managed and controlled by an operating system, such as LINUX, UNIX, Microsoft Windows, Apple Macintosh, and/or other proprietary or open source operating system.

To facilitate communication with a network, a client device includes a network interface, such as an Ethernet (IEEE 802.3), wi-fi (802.11), or wi-max (802.16). In addition, a client device may also include, but not be limited to, a central processing unit (CPU), system memory (DRAM), video memory, video display, hard drive, I/O ports, and/or keyboard.

A client device may execute one or more applications, such as a web browser (e.g., Microsoft Internet Explorer, Google Chrome, Mozilla Firefox, and Apple Safari) and plug-ins, languages, or other extensions (e.g., Flash Media Player, Unity 3D, AJAX, XML, HTML, Javascript), to perform game-related functions and/or access data from the servers available via one or more networks.

Servers.

Servers are computing devices that execute applications using languages such as PHP, ASP, C#, C, C++, CGI, PERL, XML, Java, JSP, SQL, PYTHON, and RUBY. Similar to client devices, servers must communicate with a network via a network interface, such as an Ethernet (IEEE 802.3), wi-fi (802.11), or wi-max (802.16). In addition, a server device may also include, but not be limited to, a central processing unit (CPU), system memory (DRAM), video memory, video display, hard drive, I/O ports, and/or keyboard.

Servers also store digital data as data files or records and, in many cases, organize the digital data into a variety of databases, such as relational and object-oriented databases. A database is logical framework that allows files and records to be created, accessed, edited, and/or deleted with maximum accuracy and speed. Digital data may take many forms, including: text, numbers, 2D and 3D images, graphics, animations, audio, video, and/or other media.

SCOPE & SPIRIT OF THE PRESENT INVENTION

The many features and advantages of the present invention are apparent from the foregoing descriptions of the preferred embodiments. The present invention, however, is not limited to these particular embodiments, as the invention is capable of being practiced and carried out in various ways. For example, new features may be added to an existing embodiment or features from two or more embodiments may be combined to produce a new embodiment. Further, features mentioned in any embodiment may be interchanged with similar features not mentioned that perform the same or similar functions. And, finally, the phraseology and terminology used to explain the embodiments are only descriptive and should not be regarded as limiting. The claims, therefore, seek to cover all features and advantages that fall within the true spirit and scope of the present invention.

The invention claimed is:

1. A method, comprising operations of:
displaying to a user a virtual game space for an online game space, wherein the virtual game space is terraformed and has a corresponding topography;
receiving a first modification to the topography from the user, wherein the modification creates a terraformed feature; and
providing a game benefit to the user that includes a virtual object, wherein the virtual object corresponds to the terraformed feature and wherein each of the operations is executed by one or more processors.

2. The method of claim 1, wherein the terraformed feature is a raised elevation and wherein the virtual object includes metal ore.

3. The method of claim 1, wherein the terraformed feature is a raised elevation and wherein the virtual object includes plants that can be harvested.

4. The method of claim 1, wherein the terraformed feature is a raised elevation and wherein the virtual object includes animals that can be herded.

5. The method of claim 1, wherein the terraformed feature is a raised elevation and wherein the virtual object includes a building with a rental value that is higher due to being located on the raised elevation.

6. The method of claim 1, wherein the terraformed feature is a body of water and wherein the virtual object includes fish.

7. The method of claim 1, wherein the terraformed feature is a body of water and wherein the virtual object includes water that can be used for drinking or irrigation.

8. The method of claim 1, wherein the terraformed feature is a body of water and wherein the virtual object includes a building with a rental value that is higher due to being proximate to the body of water.

9. The method of claim 1, further comprising the operation of:
receiving a second modification to the topography from the user, wherein the second modification removes the terraformed feature and the virtual object that corresponds to the terraformed feature.

10. One or more computer-readable media persistently storing a program, wherein the program, when executed, instructs one or more processors to perform the following operations:
display to a user a virtual game space for an online game space, wherein the virtual game space is terraformed and has a corresponding topography,
receive a first modification to the topography from the user, wherein the modification creates a terraformed feature; and
provide a game benefit to the user that includes a virtual object, wherein the virtual object corresponds to the terraformed feature.

11. The computer-readable media of claim 10, wherein the terraformed feature is a raised elevation and wherein the virtual object includes metal ore.

12. The computer-readable media of claim 10, wherein the terraformed feature is a raised elevation and wherein the virtual object includes plants that can be harvested.

13. The computer-readable media of claim 10, wherein the terraformed feature is a raised elevation and wherein the virtual object includes animals that can be herded.

14. The computer-readable media of claim 10, wherein the terraformed feature is a raised elevation and wherein the virtual object includes a building with a rental value that is higher due to being located on the raised elevation.

15. The computer-readable media of claim 10, wherein the terraformed feature is a body of water and wherein the virtual object includes fish.

16. The computer-readable media of claim 10, wherein the terraformed feature is a body of water and wherein the virtual object includes water that can be used for drinking or irrigation.

17. The computer-readable media of claim 10, wherein the terraformed feature is a body of water and wherein the virtual object includes a building with a rental value that is higher due to being proximate to the body of water.

18. The computer-readable media of claim 10, further comprising the operation of:
receive a second modification to the topography from the user, wherein the second modification removes the terraformed feature and the virtual object that corresponds to the terraformed feature.

19. A method, comprising operations of:
displaying to a user a virtual game space for an online game space, wherein the virtual game space is terraformed and has a corresponding topography;
receiving a first modification to the topography from the user, wherein the modification creates a terraformed feature;
providing a game benefit to the user that includes a virtual object, wherein the virtual object corresponds to the terraformed feature and wherein the terraformed feature is a raised elevation and the virtual object includes a building with a rental value that is higher due to being located on the raised elevation; and
receiving a second modification to the topography from the user, wherein the second modification removes the terraformed feature and the virtual object that corresponds to the terraformed feature and wherein each of the operations is executed by one or more processors.

20. The method of claim 19, wherein the modifications to the topography are purchase by the user using virtual currency or real world currency.

* * * * *